Nov. 3, 1931.    T. OHNO    1,830,405
SHUTTER
Filed Jan. 12, 1927    4 Sheets-Sheet 1
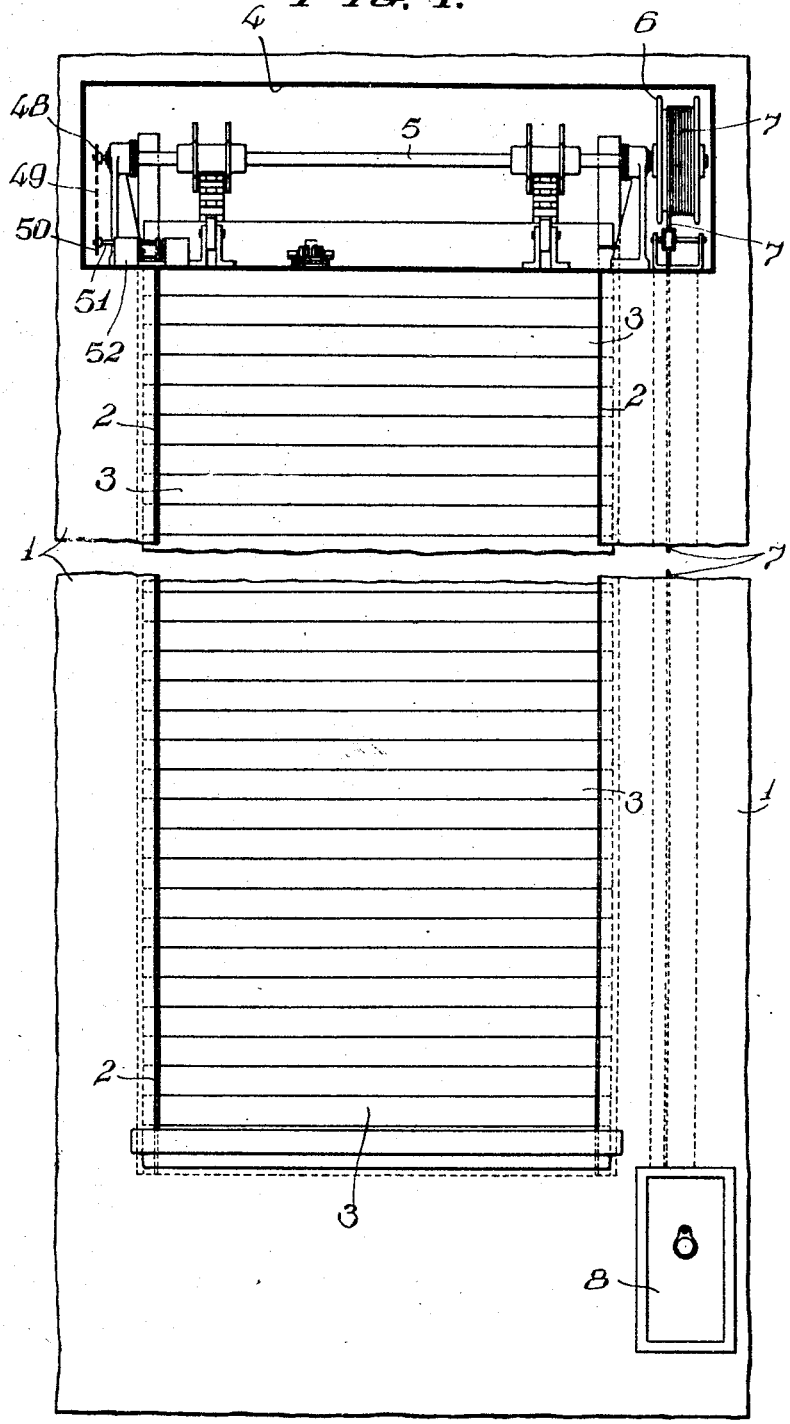
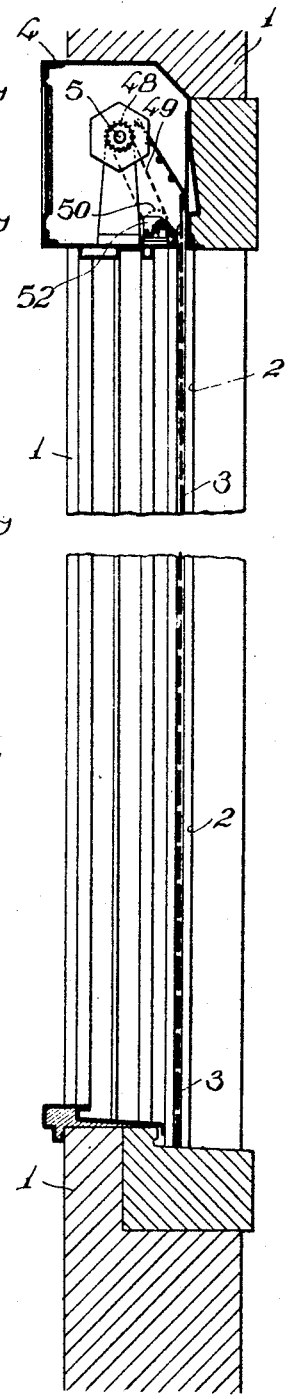
T. Ohno INVENTOR
By: Marks & Clark Attys.

Nov. 3, 1931.  T. OHNO  1,830,405
SHUTTER
Filed Jan. 12, 1927  4 Sheets-Sheet 2
Fig. 3.
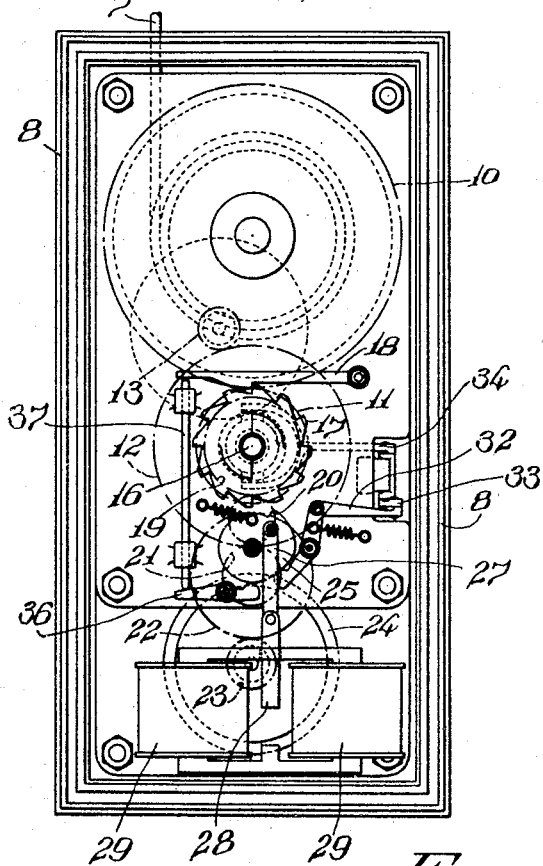
Fig. 4.
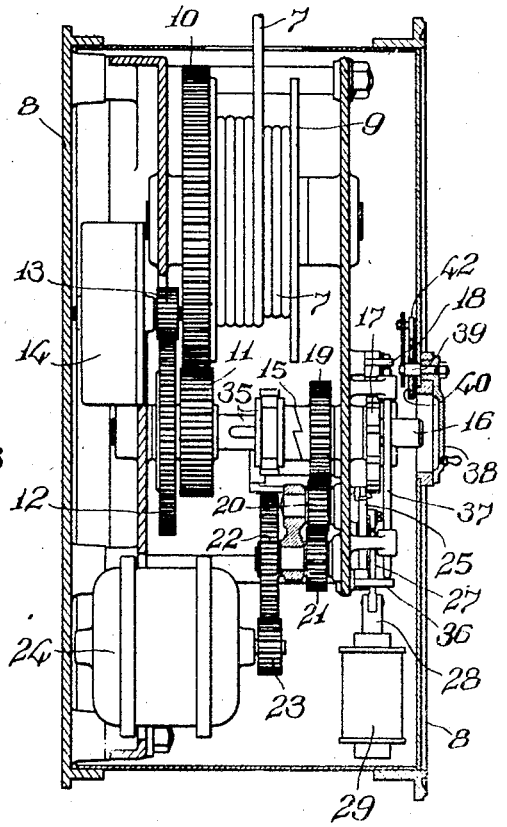
Fig. 5.
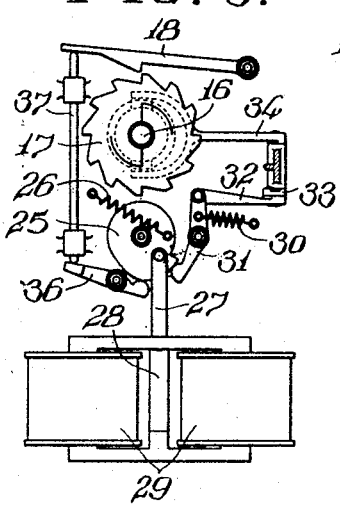
Fig. 6.
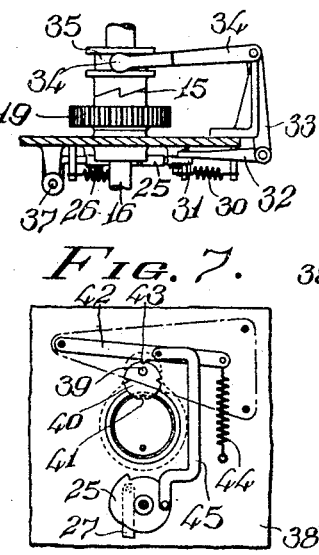
Fig. 7.
Fig. 8.
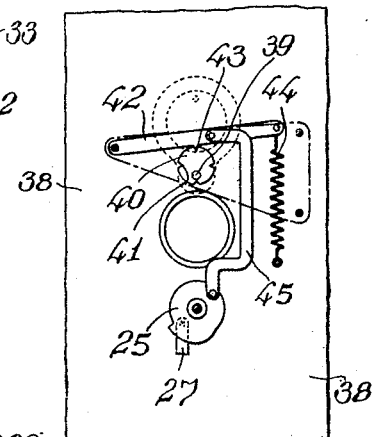
T. Ohno
INVENTOR
By: Marks & Clark
Attys.

Nov. 3, 1931.  T. OHNO  1,830,405
SHUTTER
Filed Jan. 12, 1927   4 Sheets-Sheet 4

Patented Nov. 3, 1931

1,830,405

UNITED STATES PATENT OFFICE

TADASHI OHNO, OF HONGOKU, TOKYO, JAPAN

SHUTTER

Application filed January 12, 1927. Serial No. 160,753.

My invention relates to improvements in shutters, comprising electrical means for opening and closing shutters simultaneously, and means for manually opening and closing one shutter irrespective of others.

The object of the invention is to provide a shutter which may be safely and steadily operated by electrical means as well as by the manual operation.

The accompanying drawings show an example of the shutter embodying the present invention in which Fig. 1 is an elevation of the shutter as seen from inside, the shutter box being broken away to show the mechanism inside.

Fig. 2 is a sectional side elevation of Fig. 1.

Fig. 3 is an enlarged front view of the housing of the mechanism with its cover opened to show the mechanism inside.

Fig. 4 is a sectional side elevation of Fig. 3.

Fig. 5 is a fragmental elevation showing part of the controlling mechanism.

Fig. 6 is a plan view of Fig. 5.

Fig. 7 is a fragmental front view of the manual mechanism as seen from inside.

Fig. 8 is a fragmental elevation showing the operation of the manual mechanism.

Figure 9:
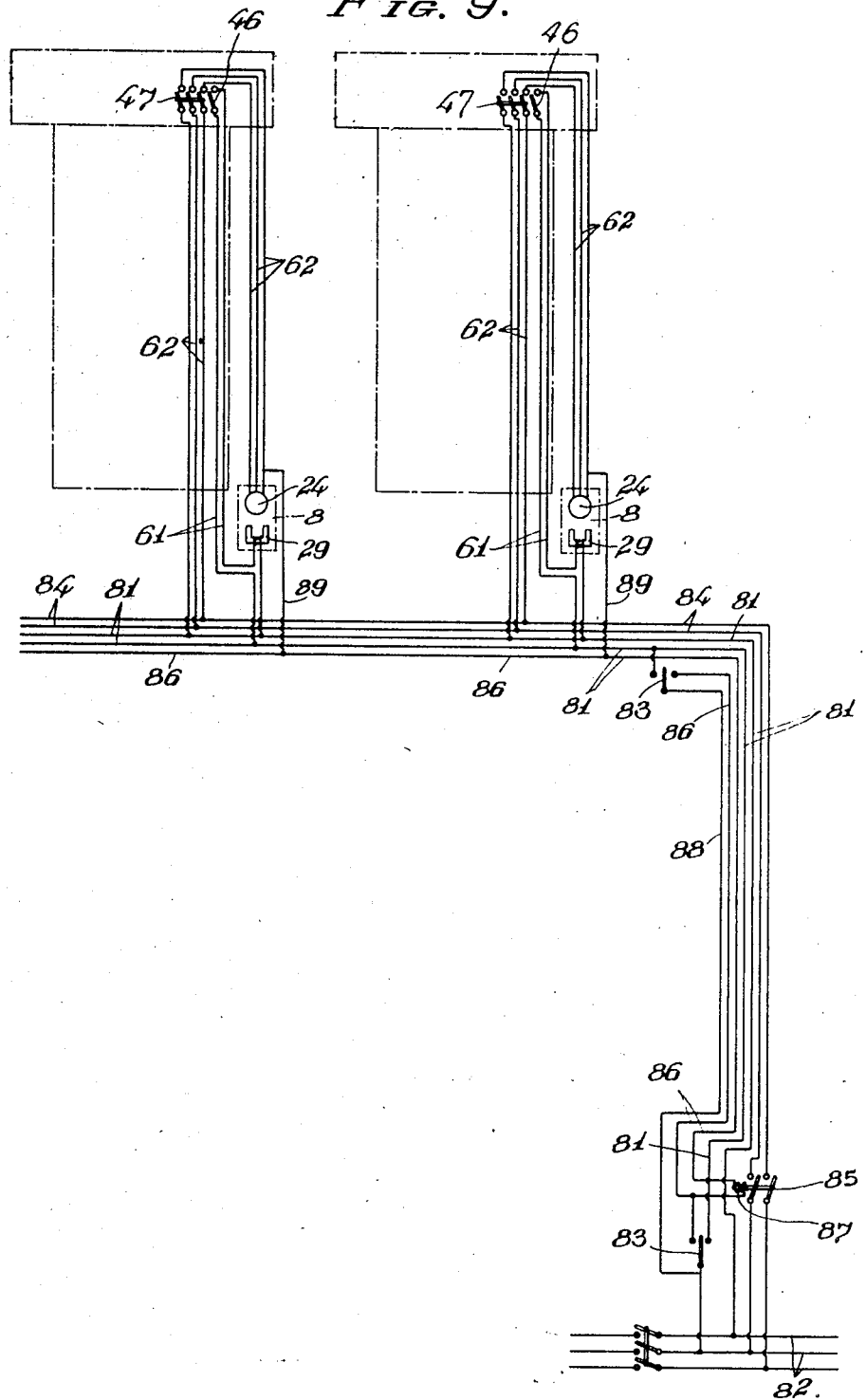
Fig. 9 is a diagrammatic view showing the electrical connection of the improved shutters.

Referring first to Figs. 1 and 2, (1) is an opening for entrance or window in which the shutter is to be provided, (2) (2) are channels or grooves arranged at both sides of the opening (1), (3) is a flexible curtain composed of numbers of narrow steel slats successively fastened together, (4) is a shutter box arranged at the upper part of the opening (1), (5) is a shaft arranged within the shutter box to roll the curtain on, (6) is a rope drum fixed at one end of the shaft (5), (7) is a wire rope wound on the drum (6), and (8) is a housing for receiving the operating mechanisms.

Within said housing (8) a drum (9) is arranged for winding the other end of the rope (7) as shown in Figs. 3 and 4. On the shaft of the drum (9) is fixed a toothed gear (10) which is connected through toothed wheels (11) (12) and (13) to a centrifugal brake governor (14) by means of which the accelerating speed of the curtain in falling is restrained. At the front end of the shaft (16) of said toothed wheels (11) and (12) a ratchet wheel (17) is fixed and the rolled curtain is prevented from falling by a controlling pawl (18) engaging on said ratchet wheel. The shaft (16) is further provided with a two part clutch (15) having inclined claws for transmitting the rotation only in one direction and one part of said clutch is rotatably mounted on the shaft (16) and carries a toothed wheel (19) which in turn meshes with a train of toothed wheels (20) (21) (22) and (23) and is finally connected to an electric motor (24) arranged at the lower part of the mechanism housing for rolling up the shutter.

When the curtain (3) is rolled on the shaft (5) and the controlling pawl (18) is engaged on the ratchet wheel (17), as shown in Fig. 3, the shutter is kept open. On disengaging the pawl (18) from the ratchet wheel (17) and disengaging the clutch (15) from the shaft (16), the latter is freed so that the curtain (3) gradually unrolls from the shaft (5), winding the rope (7) on the drum (6) and unwinding it from the drum (9), thus the shutter is closed. The governor (14) revolves accordingly and by the centrifugal brake action, the acceleration of speed of the falling curtain is restrained.

When the motor (24) is rotated and the clutch (15) engaged, the shaft (16) is rotated through toothed wheels (23) (22) (21) (20) (19) and the clutch (15) and through the toothed wheels (11) and (10), the drum (9) is rotated and the rope (7) is wound thereon so that the curtain (3) is rolled on the shaft (5) and the shutter is thus opened. Means is also provided for manually opening and closing the shutter which will be described hereinafter.

The mechanism for simultaneously engaging and disengaging the clutch (15) and operating the pawl (18) for the ratchet wheel (17) is shown in Figs. 5 and 6. Below the ratchet wheel (17) is arranged a cam (25) provided with a spring (26) for normally turning it in one direction so that the projected or prominent part of said cam is normally disposed at the side as shown in Fig. 3. A link (27) is fastened to said cam and at the lower end it is attached to an iron piece or armature (28) to be operated by an electromagnet (29). When electric current flows through the electromagnet (29) and the armature (28) is attracted thereto, the cam (25) is turned so that its projected part is disposed downward as shown in Fig. 5. At one side of the cam (25) a lever (31) is mounted and is provided at its upper arm with a spring (30), its lower arm touching the cam. The upper arm of said lever is connected to a link (32) the other end of which is linked to a bell crank lever (33) provided with a forked arm (34) which is slidably fitted into the groove (35) of the axially movable part of the aforesaid clutch (15) whereby the latter is controlled. Another lever (36) is fulcrumed below the cam (25) and engages the latter at one end, the other end engaging a vertical rod (37) the other end of which latter supports the pawl (18). When the cam (25) is rotated its projected part successively acts on the levers (31) and (36) whereby the clutch (15) is first disengaged and then the pawl (18) is disengaged so that the shaft (16) is freed and the shutter may close.

Now, the means for manually opening and closing the shutter is shown in Fig. 4. An opening for passage of the handle is formed at the end of the shaft (16) on the cover of the mechanism housing (8) and a cover (38) is arranged thereon. At the inner end of the pivotal axis (39) of the cover (38) a cam (40) is fixed provided with notches (41) one of which engages with the notch (43) of an arm (42) provided with a spring (44) as shown in Figs. 7 and 8. A bent link (45) is fastened to the arm (42) and the other end of said link is connected at the other side of aforesaid cam (25). When the cover (38) is closed the cam (40) rotates downward as shown in Fig. 7, and when the cover (38) is rotated upward to open the handle opening as shown in Fig. 8 the arm (42) is swung upward and the cam (25) is rotated by the link (45) so that the levers (31) and (36) are operated and the clutch (15) as well as the pawl (18) are disengaged. Thus at the time when the shutter is closed a suitable handle not shown in the drawings may be fitted at the end of the shaft (16) through the handle opening and the curtain may be manually rolled up or the shutter opened. On the other hand, when the shutter is in open position, the cover (38), when opened, releases the clutch (15) and pawl (18) and permits the shutter to move to closed position.

Figure 10:
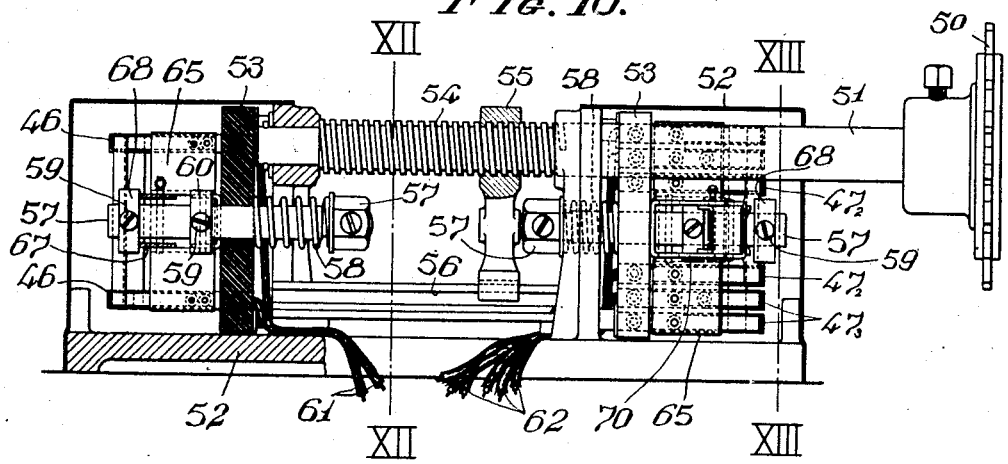
Fig. 10 is a detailed front view of the automatic switch partly in section.
Figure 13:
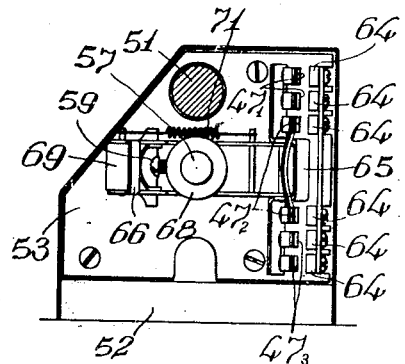
Fig. 13 is a cross sectional view at (XIII) (XIII) line Fig. 10.

The electric circuit for simultaneously opening and closing a plurality of shutters may be provided as shown in Fig. 9. A three terminal switch (47) is provided for the motor (24) and a single terminal switch (46) for the electromagnet (29). As it is necessary for carrying out the present invention that when the electromagnet (29) is energized and the armature (28) is attracted thereto as shown in Fig. 5, the clutch (15) shall be disengaged to permit the curtain to unroll by itself, and that, when the motor (24) is operated for opening the shutter, the clutch (15) shall be kept in engagement so that the power of the motor is transmitted to the rope drum (9) through the gear trains, the aforesaid switches (46) and (47) are constructed so as to be opened or closed contrary to each other. An automatic arrangement for actuating the switches (46) and (47) in proper relation is provided in connection with the curtain shaft. As shown in Fig. 1 a chain wheel (48) is fixed at an end of the shaft (5) and is geared to a chain wheel (50) by a chain (49). The shaft (51) of the chain wheel (50) passes through an automatic switch box (52) fixed inside the shutter box (4) and provided with bearing walls (53) (53) of insulating material upon which the shaft (51) is supported. The shaft (51) is provided with a threaded part (54) and a slider (55) is screwed thereon so that it can slide on the guide (56) according to the direction of rotation of the screw shaft (51). The walls (53) (53) support bars (57) (57) provided with springs (58) (58) and heads disposed in line with the slider (55). Collars (60) (60) are fixed on said bars (57) (57) by set screws (59) (59) at the outer sides of the walls (53) (53) so that the strokes of the bars (57) (57) to be operated by the slider (55) may be properly limited. The bars (57) (57) are associated with conductors (63) (64) respectively connected to leading wires (61) (62). Contact pieces (46) and (47) respectively corresponding to adjoining pairs of aforesaid conductors (63) and (64) (as shown in Figs. 10 and 13) are attached on a hinge (65). The hinges (65) are provided with arms (66) (66) having projected parts (67) (67) at their sides which projected parts are located between the collars (60) (60) and collars (68) (68) adjustably fixed on the bars (57) (57) with suitable clearances. The lower ends of the arms (66) (66) are knuckled to links (69) (69) so as to permit the arms (66) to swing through a certain angle. The other ends of the links are pivoted on supports (70) (70) fixed inside the walls (53) (53) and spiral springs (71) (71) are stretched between the arms (66) (66) and the supports (70) (70). In the arrangement shown in Figs. 10 and 11 the switch at the left side corresponds to the switch (46) in Fig. 9, and the switch at the right side corresponds to the switch (47) in Fig. 9. As the switch (46) is the single terminal switch as stated, the conductors (63) at the left side are composed of two metal bars respectively connected to a pair of leading wires (61) (61) and the corresponding contact piece (46) is made of only one metal block so that when said contact piece is brought in contact with the conductors (63) (63) the leading wires (61) (61) are connected to each other and when brought out of contact the circuit is disconnected. The other switch (47) is the three terminal switch hence the conductors (64) are arranged in three pairs respectively connected to three pairs of leading wires $(62_1)$ $(62_2)$ and $(62_3)$, and the corresponding six contacts pieces $(47_1)$ $(47_2)$ and $(47_3)$ are in three pairs as shown in Fig. 13 so that passage of current through the leading wire $(61_1)$ $(61_2)$ and $(61_3)$ is controlled according to the position of the switch.

Figure 11:
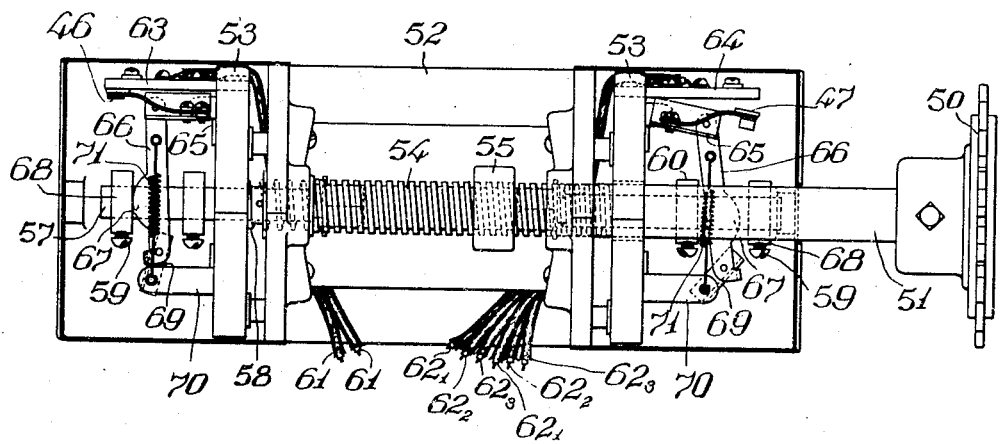
Fig. 11 is a plan view of Fig. 10.
Figure 12:
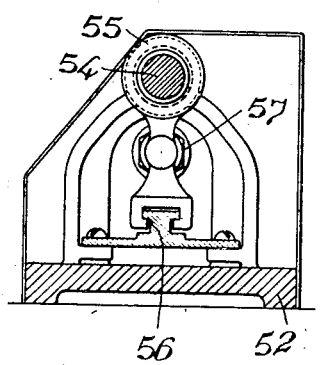
Fig. 12 is a cross sectional view at (XII) (XII) line Fig. 10.

As stated before the screw shaft (54) of the automatic switch is geared to the shutter shaft (5) and the slider (55) will slide in the automatic switch according to the rolling or unrolling of the curtain on the shaft (5). When the curtain is rolled up and the slider (55) is at the right end of its stroke as shown in Figs. 10 and 11, the bar (57) at the left hand is freed and by the spring (58) the collar (68) is pressed against the projected part (57) so that corresponding arm (66) and link (69) are kept straight and the contact piece (46) is brought in contact with the conductors (63) whereby the switch (46) is closed, the leading wires (61) (61) being connected, electric current may flow through the electromagnet (29) (see Fig. 5). While at the right hand the slider (55) presses the bar (57) as shown in Fig. 11, and corresponding arm (66) and link (69) being moved out of line by the collar (60) the contact piece (47) is brought out of contact with the conductors (64) so that each pair of the leading wires $(62_1)$ $(62_2)$ and $(62_3)$ is respectively disconnected and flow of current to the motor (24) (see Fig. 4) is interrupted. When electric current is passed through the electromagnet (29) (see Fig. 5) the pawl (18) and the clutch (15) are disengaged and the curtain (3) gradually unrolls by its own weight to close the shutter. During the unrolling movement of the curtain the shaft (5) is rotated which causes the screw shaft (54) to be rotated in the opposite direction and the slider (55) moves toward the left. When the shutter is closed the arm (66) and link (69) at the right hand of the automatic switch are moved into line by the collar (68) pressing upon the projected part (67) so that the contact pieces (47) close the corresponding pairs of the conductors and leading wires, while at the left hand the collar (60) presses the arm (66) and no sooner the arm (66) passes over the straight position with the link (69) than said arm (66) and link (69) are influenced by the tension of the spring (71) so that the contact piece (46) is instantaneously disconnected to open the circuit for the electromagnet (29). Thus by properly adjusting the position of the collars (60) and (68) on the bars (57) to have the desired clearances for the arms (66) the switches (46) and (47) may be made to operate opposite each other for the rolling or unrolling of the curtain and the shutter may be opened or closed, as desired.

An example of the connection of electric circuit for simultaneously operating numbers of shutters is shown in Fig. 9. Two leading wires (61) (61), each pair of which is connected to the electromagnet (29) in the mechanism housing (8), are provided with the single terminal switch (46) and the other end of said leading wires are connected to feed wires through common leading wires (81) (81) one of which leads directly to one of the feed wires (82) and the other through a starting switch (83) to another feeding wire (82). Three leading wires (62), each set of which is connected to the electric motor (24) in the mechanism housing (8) for each shutter and provided with said three terminal switch (47), are connected to common leading wires (84) (84) and one of aforesaid leading wires (81). The leading wires (84) (84) are connected through an automatic switch (85) to two of the feed wires (82) (82). The starting switches (83) are arranged at several points, for instance at the managing room and at each stair of the building. One terminal of each switch (83) is connected to one of the leading wires (81) and the leading wire (86) connected to one of the other terminals of each switch (83) is connected at one end to electromagnet (87) of the automatic switch (85) and at the other end by a branch line (89) to one of the leading wires (62) connected to the motor (24). The starting switches (83) are further connected to each other and to one of the feed wires (82) by a leading wire (88).

When either starting switch (83) is closed on one of its terminals, the left terminal being closed in the case of the upper switch and the right one in the case of the lower switch in Fig. 9, the current of the feed wire (82) flows through the leading wire (81) to each leading wire (61) so that in case the switch (46) is closed the current flows through the electromagnet (29) and the armature (27) is attracted whereby the clutch (15) and the pawl (18) is disengaged to release the curtain so that each shutter closes simultaneously by its own weight as shown in Fig. 5. While the curtain (3) is unrolled the screw-shaft (51) of the automatic switch (52) is rotated by means of the shutter shaft (5), chain gears (48) (49) (50) as shown in Fig. 1, and the slider (55) is made to travel on the screw shaft as shown in Figs. 10 to 13, so that at the end of the closure of the shutter the switch (46) of the automatic switch is opened to automatically disconnect the electromagnet (29) and the switch (47) becomes automatically closed. In this state when either starting switch (83) is changed to the other terminal (Fig. 9), the current flows through the electromagnet (87) through the leading wires (86) (89) (62) and (81), and the automatic switch (85) is closed so that the current of the feed wires (82) flows through the motor (24) from one of the leading wires (81) and the wires (84) (84) through each three leading wires (62) and the closed switch (47) to cause the several shutters to simultaneously open. At the end of opening movement of the shutters each automatic switch (47) is again opened by the sliders (55) and the circuit is again in the open state as stated before.

Having now particularly described and ascertained the nature of my said invention and in what manner the same is to be performed I declare that what I claim is:—

1. In combination, a shaft, a shutter adapted to be rolled on said shaft, a second shaft, means for transmitting movement from one shaft to the other shaft, a ratchet mechanism operable to prevent rotation of one of the shafts in a direction to unwind the shutter from the shutter shaft, an electric motor drive device associated with the second shaft, a clutch interposed between the motor drive device and the second shaft, and a movable member associated with the ratchet mechanism and the clutch for simultaneously rendering both of the latter inoperative, electromagnetic means for actuating the movable member and means independent of the electromagnetic means for actuating the movable member.

2. In combination, a shaft, a shutter adapted to be rolled on said shaft, a second shaft, means for transmitting movement from one shaft to the other shaft, a ratchet mechanism operable to prevent rotation of one of the shafts in a direction to unwind the shutter from the shutter shaft, an electric motor drive device associated with the second shaft, a clutch interposed between the motor drive device and the second shaft, a cam member, and levers operable by said cam and respectively connected with the ratchet device and clutch for simultaneously rendering both of the latter inoperative.

3. In combination, a shaft, a shutter adapted to be rolled on said shaft, a second shaft, means for transmitting movement from one shaft to the other shaft, a ratchet mechanism operable to prevent rotation of one of the shafts in a direction to unwind the shutter from the shutter shaft, an electric motor drive device associated with the second shaft, a clutch interposed between the motor drive device and the second shaft, a cam member, and levers operable by said cam and respectively connected with the ratchet device and clutch for simultaneously rendering both of the latter inoperative, and electromagnetic means for actuating the cam member.

4. In combination, a shaft, a shutter adapted to be rolled on said shaft, a second shaft, means for transmitting movement from one shaft to the other shaft, a ratchet mechanism operable to prevent rotation of one of the shafts in a direction to unwind the shutter from the shutter shaft, an electric motor drive device associated with the second shaft, a clutch interposed between the motor drive device and the second shaft, a cam member, and levers operable by said cam and respectively connected with the ratchet device and clutch for simultaneously rendering both of the latter inoperative, electromagnetic means for actuating the cam member and manually operable means for actuating the cam member independently of the electromagnetic means permitting release of the ratchet mechanism and consequent movement of the shutter to closed position.

5. In combination, a shaft, a shutter adapted to be rolled on said shaft, a second shaft, means for transmitting movement from one shaft to the other shaft, a ratchet mechanism operable to prevent rotation of one of the shafts in a direction to unwind the shutter from the shutter shaft, an electric motor drive device associated with the second shaft, a clutch interposed between the motor drive device and the second shaft, a movable member associated with the ratchet mechanism and the clutch for simultaneously rendering both of the latter inoperative, electromagnetic means for actuating the movable member, and a switch mechanism connected with the shutter shaft for controlling the operation of the electromagnetic means and electric motor drive device.

6. In combination, a shaft, a shutter adapted to be rolled on said shaft, a second shaft, means for transmitting movement from one shaft to the other shaft, a ratchet mechanism operable to prevent rotation of one of the shafts in a direction to unwind the shutter from the shutter shaft, an electric motor drive device associated with the second shaft, a clutch interposed between the motor drive device and the second shaft, a movable member associated with the ratchet mechanism and the clutch for simultaneously rendering both of the latter inoperative, electromagnetic means for actuating the movable member, and a switch mechanism connected with the shutter shaft for controlling the operation of the electromagnetic means and electric motor drive device, and a circuit including the switch mechanism and a manually operable circuit controlling device interposed in said circuit.

7. In combination, a shaft, a shutter adapted to be rolled on said shaft, a second shaft, means for transmitting movement from one shaft to the other shaft, a ratchet mechanism operable to prevent rotation of one of the shafts in a direction to unwind the shutter from the shutter shaft, an electric motor drive device associated with the second shaft, a clutch interposed between the motor drive device and the second shaft, a movable member associated with the ratchet mechanism and the clutch for simultaneously rendering both of the latter inoperative, electromagnetic means for actuating the movable member, electric switches associated with the electromagnetic means and the electric motor drive device, respectively, and means for alternately actuating said switches from the shutter shaft.

8. In combination, a shaft, a shutter adapted to be rolled on said shaft, a second shaft, means for transmitting movement from one shaft to the other shaft, a ratchet mechanism operable to prevent rotation of one of the shafts in a direction to unwind the shutter from the shutter shaft, an elecric motor drive device associated with the second shaft, a clutch interposed between the motor drive device and the second shaft, a movable member associated with the ratchet mechanism and the clutch for simultaneously rendering both of the latter inoperative, electromagnetic means for actuating the movable member, electric switches associated with the electromagnetic means and the electric motor drive device, respectively, and means for alternately actuating said switches from the shutter shaft, said last mentioned means including a screw shaft actuated by the shutter shaft, and means actuated by the screw shaft for effecting operation of the switches.

9. In combination, a shaft, a shutter adapted to be rolled on said shaft, a second shaft, means for transmitting movement from one shaft to the other shaft, a ratchet mechanism operable to prevent rotation of one of the shafts in a direction to unwind the shutter from the shutter shaft, an electric motor drive device associated with the second shaft, a clutch interposed between the motor drive device and the second shaft, a movable member associated with the ratchet mechanism and the clutch for simultaneously rendering both of the latter inoperative, electromagnetic means for actuating the movable member, electric switches associated with the electromagnetic means and the electric motor drive device, respectively, and means for alternately actuating said switches from the shutter shaft, said last mentioned means including a screw shaft actuated by the shutter shaft, an actuating member mounted on the screw shaft, an spring pressed members operable by the actuating member normally tending to close said switches.

In testimony whereof I have affixed my signature.

TADASHI OHNO.